UNITED STATES PATENT OFFICE.

WILLIAM E. CARSON, OF RIVERTON, VIRGINIA.

PROCESS OF SLAKING LIME.

1,184,320. Specification of Letters Patent. Patented May 23, 1916.

No Drawing. Application filed December 4, 1915. Serial No. 65,053.

*To all whom it may concern:*

Be it known that I, WILLIAM E. CARSON, a citizen of the United States, residing at Riverton, in the county of Warren and State of Virginia, have invented certain new and useful Improvements in Processes of Slaking Lime, of which the following is a specification.

This invention relates to processes of slaking lime; and it comprises a method of slaking quicklime to give a completely hydrated dry lime, capable, upon further additions of water, of producing a highly plastic, buttery lime mortar, or putty, wherein quicklime is slaked by water carrying in suspension any inert amorphous insoluble material, which is sufficiently finely divided to form an emulsion or suspension with water or which can be so divided either by grinding, by deflocculation with chemical reagents, by electrolysis or any other means, said suspension being stabilized by the presence of a deflocculating chemical; all as more fully hereinafter set forth and as claimed.

It is well recognized that the quality of slaked lime depends very much upon the particular manner in which the slaking has been conducted; and that the profound differences in quality of slaked limes existing are not due, or at least not exclusively due, to chemical differences in the original quicklimes. As a matter of fact, quicklimes of very different chemical composition, can, by appropriate methods, be slaked to give much the same grades of slaked lime; while on the other hand, very different articles of slaked lime may be made from one and the same quicklime by different ways of slaking. The reason for these differences is not well understood; but it is supposed to be due to the obscure phenomena of "colloid chemistry."

Lime is now extensively marketed in a dry, hydrated form, made by various methods of slaking, and ready upon further additions of water, to be worked up into plastic mortars and plasters. These, however, it is found do not give as entirely satisfactory an article as is produced by the old methods from good grades of lime wherein the lime is slaked and made into mortar as a continuous operation.

It is an object of the present invention to produce an article of dry hydrated lime which will give high quality mortars and plasters upon working up with more water.

It is known that in a minute quantity the presence of finely divided insoluble mineral matters such as clay or magnesia may be beneficial to the quality of lime, making the hydrates obtained from such lime much more plastic or buttery under the trowel. Heretofore, this result has been obtained mainly so to speak accidentally in cases where such finely divided mineral was naturally contained in the lime in such manner that it was intimately distributed therethrough. Attempts to add it artificially in such a manner as to secure the same results have been futile save in the case of certain materials such as alumina (Patent 915060) which are not so sensitive to the flocculating action of lime. I have however discovered that I can obtain these results by using in conjunction with the finely divided mineral matter such chemicals as oppose flocculating of such mineral matter; by using in connection with the watery suspension of mineral matter what may be termed a stabilizing reagent. For the present purposes, the mineral matter must be very finely divided; even more finely than is the case with some clays. I find that when clay or other inert amorphous insoluble matter is mixed in a decided excess of water and settles out rapidly, it is not sufficiently finely divided to give the proper results, and must be deflocculated by the addition of the proper reagent. Most clays can be deflocculated by two tenths of one per cent. of caustic soda, which should be dissolved in the water before adding the clay. The deflocculating reagent may very conveniently also be the stabilizing reagent. Clay may for example be deflocculated by a weak solution of caustic soda, allowed to settle to deposit sand and coarse matter and the resulting suspension, in which the soda now acts as a stabilizer, used for the present purposes. The stabilizing reagent and its quantity may vary considerably. Weak solutions of hydrochloric or other acid may be used as may weak solutions of caustic soda or other alkali. The only function of the stabilizer is to preserve the fine state of division until the suspension reaches and is uniformly incorporated with the lime; hence acid deflocculants may be used. Too much reagent causes flocculation and is worse than none at all.

In the present invention I produce a watery suspension of a finely divided inert amorphous insoluble material and use a stabilizer with it, such as caustic soda, caustic potash, ammonia, hydrochloric acid, and the like. The finely divided inert amorphous material may be ordinary clay, magnesia, or finely ground mineral matter of any kind, but clay or magnesia I regard as the best for my purposes. This suspension is used in slaking the lime.

The amounts of mineral matter necessary in the present process, for producing profound beneficial effects upon lime are small. For example, in making 50 tons of hydrated lime, to 700 gallons of water may be added nineteen and a half ounces of caustic soda and 650 pounds of clay, the whole being stirred up to a slurry. The slurry should be allowed to settle to get rid of sand and coarse matter. The suspension or emulsion so made can either be added to the water used in hydrating 50 tons of hydrate, say, 8,000 gallons of water, or be allowed to flow on the lime simultaneously with the rest of the water necessary for slaking. The bulk of the water necessary for hydrating may flow to the lime through a pipe, hose, or the like, and into this flow prior to its contact with the lime a minor flow of the suspension or emulsion can be directed.

The proportion of clay or the like used in the water and for heating the lime is regulated by the properties of the particular clay or other material used and economic conditions. The amount of clay, or other inert amorphous insoluble material, ordinarily does not exceed ten per cent. of the weight of the dry lime. The stabilizing reagent may be dissolved in the water and then the inert amorphous insoluble material stirred into the solution and allowed to stand for a short time till the coarser material settles down, the suspension or emulsion left being in proper condition to be used in slaking or hydration.

The manner in which slaking is effected is not a matter of indifference. As stated *ante*, different methods of slaking give very different grades of product and while the present method of adding a stabilized suspension of mineral matters is useful in any method of slaking, I find it particularly useful in the method described and claimed in my application Serial No. 53,049. In this method of slaking, the lime in a more or less finely divided condition is stirred up into a magma or paste with water and the milk or cream of lime thus produced is deposited in a tall vertical chamber in successive layers, the deposition being effected prior to the occurrence of any substantial hydration. A pile of the mixture is built up rapidly in the tall chamber and allowed to stand therein to slake and season for several days. Under these circumstances, slaking does not begin until the lime has been deposited in a layer and is covered by a succeeding layer. The layer of mixture is then slaked in an atmosphere of its own vapor, the next succeeding layer acting, in a way, as a sealing layer to keep in the vapor and the heat. Under the described conditions, as I have found, even high magnesia limes may be completely and perfectly hydrated, the magnesia hydrating as well as the lime. Such a magnesian lime with the magnesia completely hydrated, gives an unusually plastic mortar, or putty. Such a high magnesian lime may even give a better and more plastic slaked lime than ordinary "fat" limes containing little or no MgO and consisting practically entirely of CaO. I have found however, that I can even improve the quality of these high grade slaked limes so produced by using the addition of the stabilized suspension of mineral matter of the present invention. And, I find that even with the highly plastic completely hydrated high magnesia lime produced in the manner described, the quality is still further improved by using a little magnesia in the stabilized suspension just referred to. With this grade of lime however, the addition of a little clay is, or may be, better than of magnesia itself.

What I claim is:—

1. The process of slaking lime which comprises making a suspension of a finely divided mineral matter in water containing a small amount of caustic alkali and slaking lime with the aid of such suspension.

2. The process of slaking lime which comprises making a suspension of clay in water containing a small amount of caustic alkali and slaking lime with the aid of such suspension.

3. The process of slaking lime which comprises making a suspension of a finely divided mineral matter in water containing a small amount of a deflocculating and suspension-stabilizing reagent and slaking lime with the aid of such suspension.

4. The process of slaking lime which comprises making a suspension of clay in water containing a small amount of a deflocculating and suspension-stabilizing agent and slaking lime with the aid of such suspension.

5. The process of slaking lime which comprises mixing lime with water containing suspended finely divided mineral matter maintained in suspension by a small amount of dissolved alkali, and rapidly depositing the mixture so obtained in layers in vertical succession, prior to the occurrence of any substantial slaking in any such layer.

6. The process of slaking lime which comprises mixing lime with water containing suspended clay maintained in suspension by a small amount of dissolved alkali, and rapidly depositing the mixture so obtained in layers in vertical succession, prior to the occurrence of any substantial slaking in any such layer.

7. In slaking lime, the process which comprises producing a thin permanent suspension of clay in water and stabilizing the same against deposition of the suspended matters, and slaking lime with such stabilized suspension.

In testimony whereof, I affix my signature.

WILLIAM E. CARSON.